US011543597B2

(12) United States Patent
Beri et al.

(10) Patent No.: US 11,543,597 B2
(45) Date of Patent: Jan. 3, 2023

(54) FERRULE-LESS FIBER OPTIC CONNECTOR WITH RE-COAT LAYER TO PROTECT BUCKLING PORTION OF OPTICAL FIBER

(71) Applicant: COMMSCOPE TECHNOLOGIES LLC, Hickory, NC (US)

(72) Inventors: Stefano Beri, Brussels (BE); Jan Watté, Grimbergen (BE); Valja Everaert, Wetteren (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 257 days.

(21) Appl. No.: 16/961,518

(22) PCT Filed: Jan. 8, 2019

(86) PCT No.: PCT/US2019/012683
§ 371 (c)(1),
(2) Date: Jul. 10, 2020

(87) PCT Pub. No.: WO2019/139894
PCT Pub. Date: Jul. 18, 2019

(65) Prior Publication Data
US 2020/0355875 A1    Nov. 12, 2020

Related U.S. Application Data

(60) Provisional application No. 62/616,876, filed on Jan. 12, 2018.

(51) Int. Cl.
*G02B 6/38* (2006.01)
*G05B 15/02* (2006.01)

(52) U.S. Cl.
CPC ........ *G02B 6/3809* (2013.01); *G02B 6/3861* (2013.01); *G02B 6/3885* (2013.01); *G02B 6/3834* (2013.01); *G02B 6/3862* (2013.01); *G05B 15/02* (2013.01)

(58) Field of Classification Search
CPC .................................................. G02B 6/3809
See application file for complete search history.

(56) References Cited

U.S. PATENT DOCUMENTS 5,694,506 A * 12/1997 Kobayashi ........... G02B 6/3825
385/60
8,870,466 B2   10/2014 Lu
9,304,262 B2    4/2016 Lu
(Continued)

FOREIGN PATENT DOCUMENTS

JP    2012-002882 A    1/2012
JP    2012-230266 A   11/2012
(Continued)

OTHER PUBLICATIONS

Extended European Search Report for European Patent Application No. 19738856.4 dated Aug. 11, 2021, 8 pages.
(Continued)

*Primary Examiner* — Michael Stahl
(74) *Attorney, Agent, or Firm* — Merchant & Gould P.C.

(57) ABSTRACT

The present disclosure relates to using a coating to protect a portion of an optical fiber that is intended to buckle within a fiber optic connector. The fiber optic connector can include a bare fiber optical connector.

20 Claims, 6 Drawing Sheets

(56) References Cited

U.S. PATENT DOCUMENTS

| | | | |
|---|---|---|---|
| 2012/0128303 A1 | 5/2012 | Koyama et al. | |
| 2014/0321811 A1 | 10/2014 | Miller et al. | |
| 2014/0341511 A1* | 11/2014 | Daems | G02B 6/3889 385/77 |
| 2016/0018604 A1 | 1/2016 | Gurreri et al. | |
| 2016/0018605 A1 | 1/2016 | Ott et al. | |
| 2016/0291258 A1 | 10/2016 | Wang | |

FOREIGN PATENT DOCUMENTS

| | | |
|---|---|---|
| WO | 2012/112344 A1 | 8/2012 |
| WO | 2013/117598 A1 | 8/2013 |
| WO | 2015/048198 A1 | 4/2015 |
| WO | 2017/081306 A1 | 5/2017 |
| WO | 2017/192461 A2 | 11/2017 |
| WO | 2017/223072 A1 | 12/2017 |

OTHER PUBLICATIONS

International Search Report and Written Opinion of the International Searching Authority for International Patent Application No. PCT/US2019/012683 dated May 2, 2019, 12 pages.

* cited by examiner

FERRULE-LESS FIBER OPTIC CONNECTOR WITH RE-COAT LAYER TO PROTECT BUCKLING PORTION OF OPTICAL FIBER

CROSS-REFERENCE TO RELATED APPLICATION

This application is a National Stage Application of PCT/US2019/012683, filed on Jan. 8, 2019, which claims the benefit of U.S. Patent Application Ser. No. 62/616,876, filed on Jan. 12, 2018, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to ferrule-less fiber optic connectors.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Such fiber optic adapters can include specialized fiber alignment structures adapted to receive bare optical fibers. Example ferrule-less fiber optic connectors are disclosed by PCT Publication No. WO 2012/112344, PCT Publication No. WO 2013/117598, and U.S. Pat. No. 8,870,466.

SUMMARY

Aspects of the present disclosure relates to using a coating such as a re-coat layer to protect a portion of an optical fiber that is intended to buckle within a fiber optic connector. In certain examples, the portion of the optical fiber that is intended to buckle within the fiber optic connector is adapted to buckle when the fiber optic connector is optically connected to another fiber optic connector. In certain examples, the buckling action of the optical fiber and the associated elasticity of the optical fiber assists in maintaining physical contact between fiber tips of the optical fibers of the fiber optic connectors that are optically coupled together. In certain examples, the re-coat layer is configured so as to not hinder buckling, and so as to not prevent un-buckling. In certain examples, the re-coat layer blocks humidity. In certain examples, the re-coat layer is resistant to solvents such as isopropyl alcohol. In certain examples, the re-coat layer protects the buckling portion of the optical fiber from damage such as scratching from foreign materials such as dust. In multi-fiber optical connectors, the buckling portions of multiple optical fibers can be coated to prevent damage caused by interaction between the optical fibers within the fiber optic connector. In certain examples, the re-coat layer does not affect or obstruct insertion of the optical fibers within a fiber alignment system. In certain examples, the re-coat layer has a thickness that is less than or equal to 80 microns, or less than or equal to 70 microns, or less than or equal to 60 microns, or less than or equal to 50 microns, or less than or equal to 40 microns, or less than or equal to 30 microns, or less than or equal to 20 microns, or less than or equal to 10 microns, or less than or equal to 5 microns, or in the range of 5-10 microns. In certain examples, the re-coat layer on the buckling portion of the optical fiber demonstrates low friction with respect to plastics. In certain examples, the re-coat layer on the buckling portion of the optical fiber exhibits excellent adhesion to glass (e.g., to a glass cladding of the optical fiber) and does not delaminate during buckling. In certain examples, the re-coat layer on the buckling portion of the optical fiber does not delaminate over a life-time of exposure to environmental conditions (e.g., over at least 10, or 20, or 30 years).

Another aspect of the present disclosure relates to a fiber optic cable assembly including a fiber optic connector and at least one optical fiber. The fiber optic connector has a front end, a rear end, and a longitudinal axis extending between the front end and the rear end. The fiber optic connector includes an interior region in which a fiber anchoring location and a fiber buckling region are defined. The fiber buckling region is positioned between the front end of the fiber optic connector and the fiber anchoring location. The at least one optical fiber includes a core and a cladding layer surrounding the core. The at least one optical fiber includes a free end portion at the front end of the fiber optic connector, the free end portion being non-ferrulized. The cladding layer is uncoated at the free end portion. The at least one optical fiber also includes an anchored portion axially anchored within the fiber optic connector at the fiber anchoring location of the fiber optic connector. The fiber anchoring location includes anchoring adhesive that directly contacts the cladding layer of the at least one optical fiber at the anchored portion of the at least one optical fiber. The at least one optical fiber also includes a buckling portion that extends between the anchored portion and the free end portion. The buckling portion is configured to buckle when the fiber optic connector is optically connected to another fiber optic connector. At least a portion of the buckling portion of the at least one optical fiber includes a re-coat layer coated over the cladding layer.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
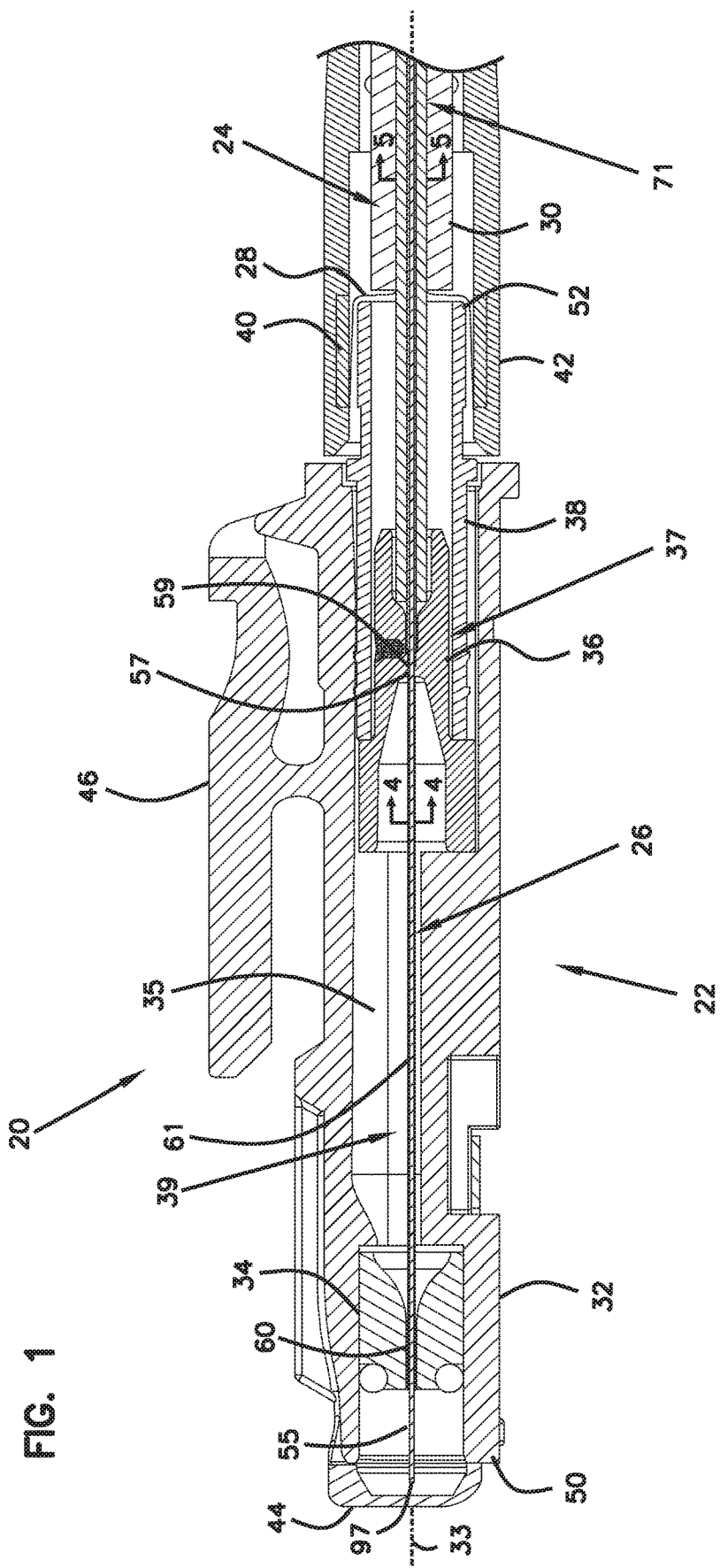
FIG. 1 is a longitudinal cross-sectional view of a fiber optic in a non-connected orientation.

FIG. 1 illustrates a fiber optic cable assembly 20 having a fiber optic connector 22. In this example, the fiber optic connector 22 is a ferrule-less fiber optic connector. The fiber optic cable assembly 20 includes the fiber optic connector 22 coupled to the end of a fiber optic cable 24. The fiber optic cable 24 includes an optical fiber 26 and a reinforcing component 28 (e.g., a flexible yarn, string, or strand-like reinforcement that may include fiberglass or Aramid yarns, or a more stiff reinforcement such as a fiberglass reinforced polymer rod) contained within a cable jacket 30.

The fiber optic connector 22 includes a main connector body 32, a fiber positioning piece 34, a fiber fixation component 36 (i.e., a fiber anchoring component), a rear connector body 38, a crimp 40, a boot 42 and a shutter 44. In certain examples, the main connector body 32 includes a latch 46 for securing the fiber optic connector 22 within a corresponding fiber optic adapter used to optically couple two fiber optic connectors together. An example fiber optic adapter is disclosed in PCT Publication No. WO 2013/117598, which is hereby incorporated by reference in its entirety.

The fiber optic connector 22 includes a front end 50 and an opposite the rear end 52. A longitudinal axis 33 of the fiber optic connector 22 is defined through the fiber optic connector 22 extending between the front and rear ends 50, 52. As used herein, "axial" means along the longitudinal axis 33 and "axially fixed" means fixed so as to prevent movement in the same general orientation as the longitudinal axis 33.

The fiber optic connector 22 includes an interior region 35 in which a fiber anchoring location 37 and a fiber buckling region 39 are defined. The fiber anchoring location 37 is defined in part by the fiber fixation component 36 which is mounted/fixed (e.g., by a press-fit, snap-fit, threaded, adhesive, or other type of attachment technique) within the rear connector body 38 which in turn is secured (e.g., by a press-fit, snap-fit, threaded, adhesive or other type of attachment technique) within the rear of the main connector body 32. The fiber buckling region 39 is positioned between the front end 50 of the fiber optic connector 22 and the fiber anchoring location 37.

Figure 4:
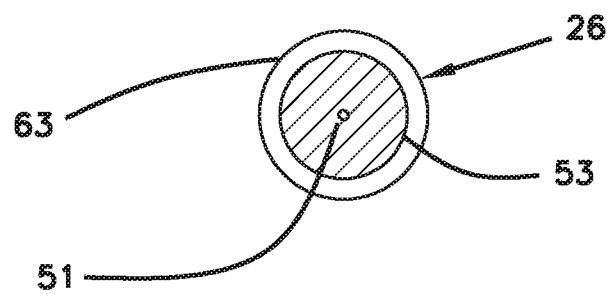
FIG. 4 is a cross-sectional view of the optical fiber of the fiber optic connector of FIG. 1 taken along section line 4-4 of FIG. 1.
Figure 5:
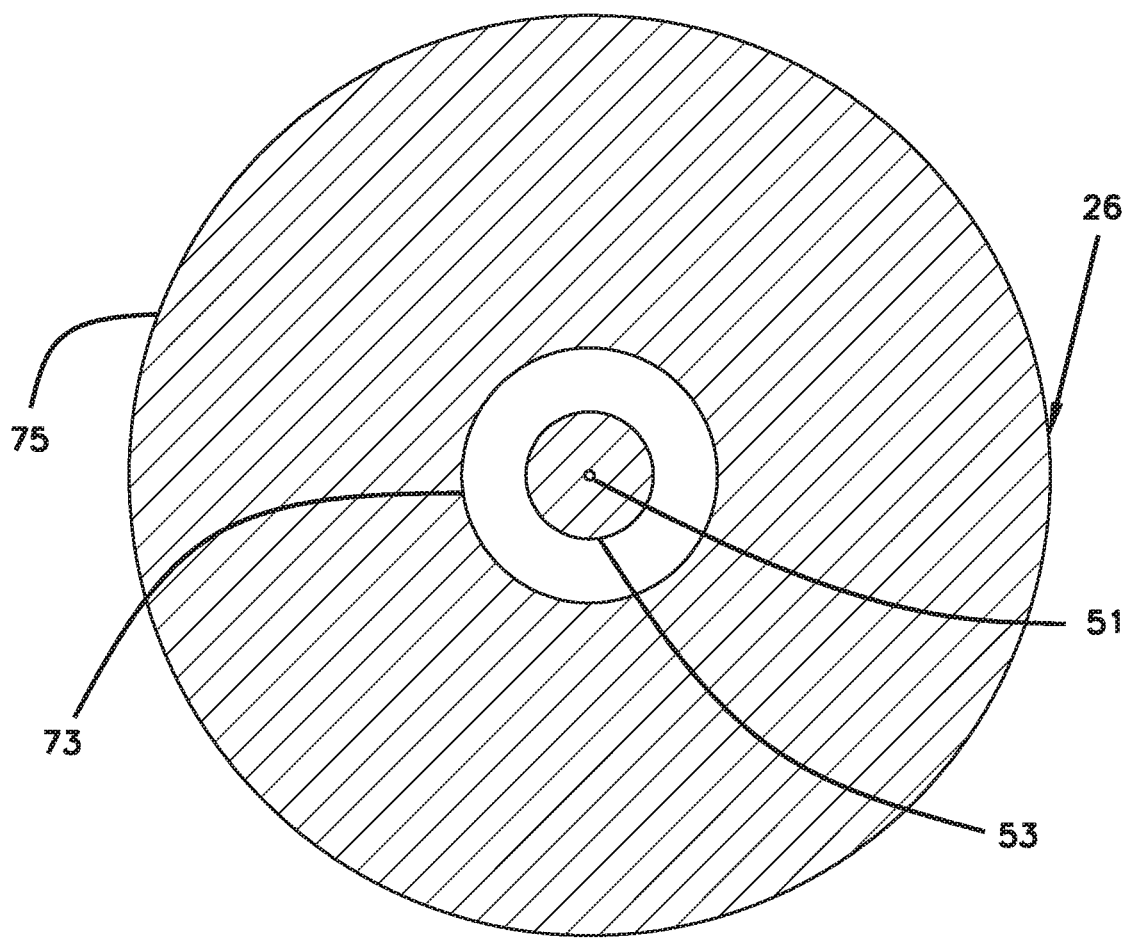
FIG. 5 is a cross-sectional view of the optical fiber of the fiber optic connector of FIG. 1 taken along section line 5-5 of FIG. 1.

As shown at FIGS. 4 and 5, the optical fiber 26 includes a core 51 and a cladding layer 53 surrounding the core 51. The refractive index of the core 51 is greater than the refractive index of the cladding layer 53 such that the optical fiber 26 functions as a waveguide capable of guiding light through the core 51 via total internal reflection. In a preferred example, the core 51 and the cladding layer 53 each have a glass construction, although plastic can also be used. The cladding layer 53 directly surrounds the core 51, and the core 51 and the cladding layer 53 without any exterior coatings can be considered a "bare" optical fiber. It will be appreciated that materials such as index matching gels that are wipeable from an optical fiber are not considered "coatings" as defined herein, and that a bare optical fiber can be covered with index matching gel while remaining a bare optical fiber by definition. For single mode optical fibers, the core 51 is generally in the range of 8-12 microns in diameter and the cladding 53 is generally in the range of 120-130 microns in diameter. Multi-mode optical fibers can also be used.

Referring back to FIG. 1, the optical fiber 26 includes a free end portion 55 at the front end 50 of the fiber optic connector 22. The free end portion 55 is preferably non-ferrulized (i.e., the connector does not include a ferrule such as a LC ferrule, SC ferrule or like structure in which the free end portion is positioned and secured). The cladding 53 of the optical fiber 26 is uncoated at the free end portion 55 (i.e., the free end portion 55 constitutes a bare fiber portion). The optical fiber 26 also includes an anchored portion 57 axially anchored within the fiber optic connector 22 (e.g., within the fiber fixation component 36) at the fiber anchoring location 37. For example, the fiber anchoring location 37 includes anchoring adhesive 59 that directly contacts the cladding 53 of the optical fiber 26 at the anchored portion 57 and bonds the optical fiber 26 to the fiber fixation component 36. In other examples, the anchored portion 57 can be fixed to a fiber fixation component at the fiber anchoring location 37 by means such as a shape memory sleeve (e.g., a heat shrink sleeve) including interior adhesive that bonds to the cladding layer 53 at the anchored portion 57. An end face 97 of the free end portion 55 can have been prepared through cleaving operations, and treatment via an energy source such as an arc plasma treatment as disclosed by PCT Publication No. WO 2012/112344, which is hereby incorporated by reference in its entirety.

Figure 2:
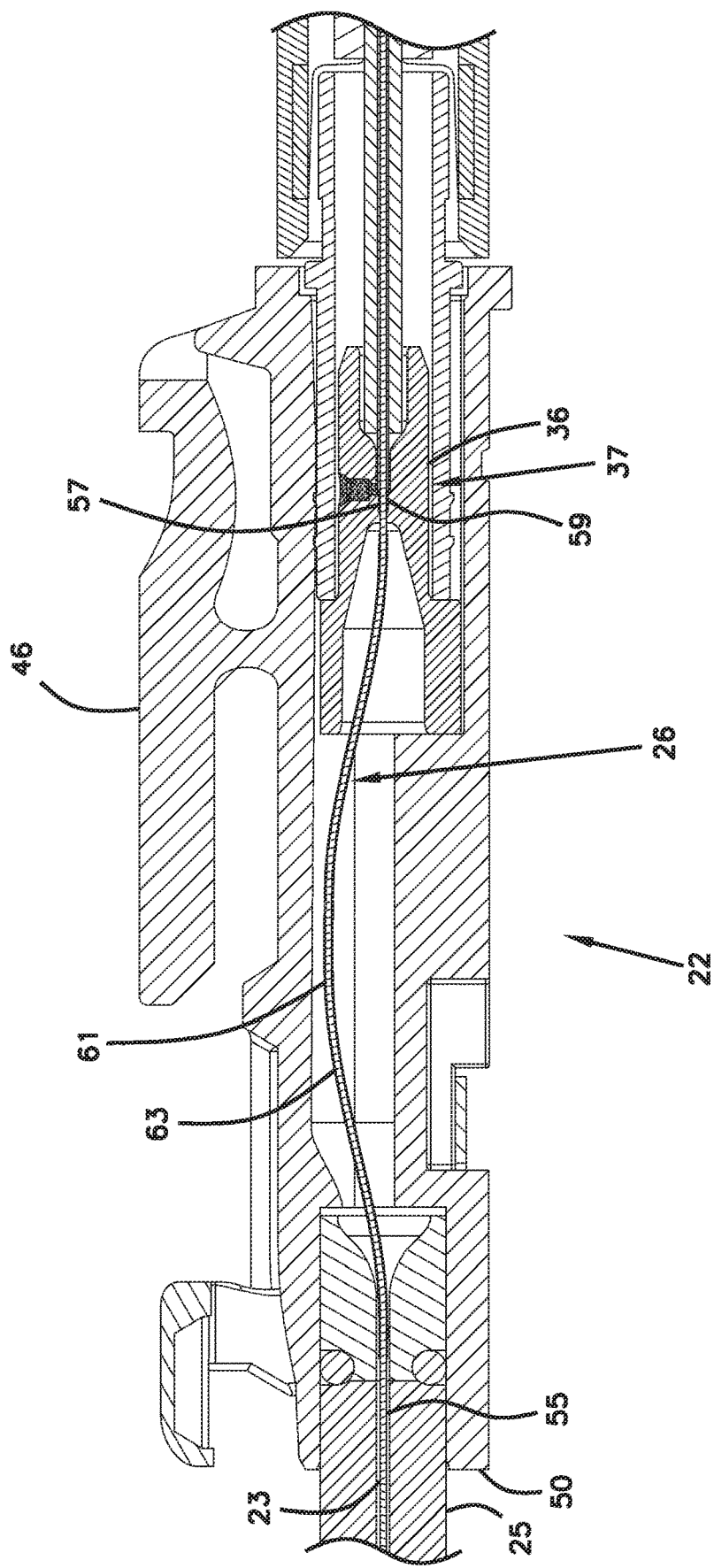
FIG. 2 shows the fiber optic connector of FIG. 1 in a connected orientation.
Figure 3:
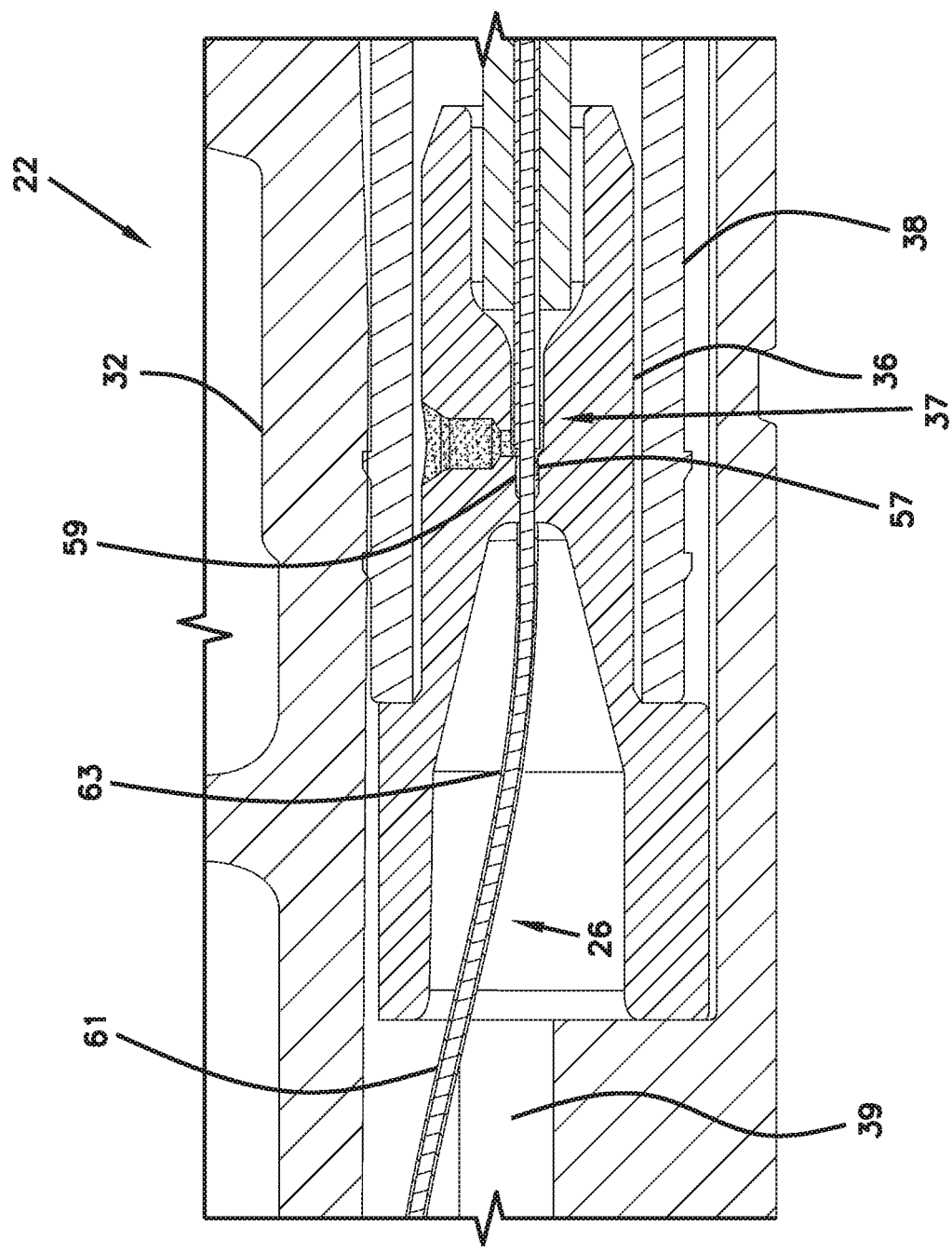
FIG. 3 is an enlarged view of a portion of FIG. 2.

The optical fiber 26 also includes a buckling portion 61 that extends between the anchored portion 57 and the free end portion 55. The buckling portion 61 is configured to buckle (as shown at FIG. 2) when the fiber optic connector 22 is optically connected to another fiber optic connector (an optical fiber 23 of which is shown at FIG. 2). A fiber alignment device 25 incorporated into a fiber optic adapter co-axially aligns the free end portion 55 of the optical fiber 26 with the optical fiber 23 of the optical connector which is desired to be optically coupled to the fiber optic connector 22.

At least a portion of the buckling portion 61 of the optical fiber 26 includes a re-coat layer 63 (see FIG. 4) coated over the cladding layer 53. The re-coat layer 63 can be adapted to protect the buckling portion 61 from scratching, damage from foreign material such as dust, moisture intrusion, damage from solvents such as isopropyl alcohol, and damage from interaction with other parts of the connector. In preferred examples, the re-coat layer 63 does not interfere with buckling or unbuckling and adheres sufficiently to the cladding layer 53 so as to not de-laminate during buckling. In certain examples, the re-coat layer 63 on the buckling portion 61 of the optical fiber 26 does not de-laminate over a life-time during exposure to environmental conditions (e.g., over at least 10, or 20, or 30 years). In certain examples, the re-coat layer 63 is a printable material that can be printed on the optical fiber 26 using a technique such as jet printing, although alternatives are possible. In certain examples, the re-coat layer 63 can be applied on the optical fiber 26 using techniques such as dip-coating or spray-coating, although alternatives are possible. In certain examples, the re-coat layer 63 has a composition that does not include acrylate. In certain examples the re-coat layer 63 is an ink, primer or varnish. In certain examples, the re-coat layer 63 is a UV-curable coating, such as a UV-curable ink. In certain examples, the re-coat layer 63 has a low coefficient of friction so as to be capable of readily sliding with respect to plastic. In certain examples, the re-coat layer 63 does not interfere with insertion of the free end portion 55 into a fiber alignment structure. The re-coat layer 63 has a thickness that is less than or equal to 80 microns, or less than or equal to 70 microns, or less than or equal to 60 microns, or less than or equal to 50 microns, or less than or equal to 40 microns, or less than or equal to 30 microns, or less than or equal to 20 microns, or less than or equal to 10 microns, or less than or equal to 5 microns, or in the range of 5-10 microns.

The fiber optic cable 24 extends rearwardly from the fiber optic connector 22. The reinforcing component 28 is anchored (e.g., crimped, clamped, bonded, etc.) to the fiber optic connector 22. In one example, reinforcing component 28 is anchored to the rear of the rear connector body 38. A main length 71 of the optical fiber 26 extends rearwardly from the fiber optic connector 22 and is contained within the cable jacket 30 of the fiber optic cable 24. The main length 71 of the optical fiber 26 includes a primary coating 73 (see FIG. 5) directly over the cladding layer 53. The primary coating 73 has a composition that includes acrylate or other polymer. The primary coating 73 has a thickness that is greater than a thickness of the re-coat layer 63. In one example, the primary coating 73 has a thickness greater than 30 microns, or greater than 40 microns or greater than 50 microns. In one example, the primary coating 73 has a thickness in the range of 55-65 microns. In one example, the primary coating 73 has a thickness of about 62.5 microns. In the depicted example, the primary coating 73 on the main length 71 of the optical fiber 26 is covered by a buffer layer 75 (see FIG. 5) having an outer diameter of about 900 microns or in the range of 700 to 1100 microns. The buffer layer 75 can also include a polymeric composition such as polyvinyl chloride (PVC) or other polymer.

Referring back to FIG. 1, the shutter 44 mounts at the front end 50 of the fiber optic connector 22 and is preferably movable relative to the main connector body 32 between an open position and a closed position. The shutter 44 is designed to protect the free end portion 55 of the optical fiber 26 when the fiber optic connector 22 is not being used to make an optical connection. When it is desired to make an optical connection using the fiber optic connector 22, the fiber optic connector 22 can be inserted into a port of a fiber optic adapter. As the fiber optic connector 22 is inserted into the adapter port, the shutter 44 moves from the closed positon to the open positon to expose and provide access to the free end portion 55 of the optical fiber 26. With the free end portion 55 of the optical fiber exposed, the free end portion 55 of the optical fiber 26 can slide into a fiber alignment device 25 (see FIG. 2) of a fiber optic adapter which co-axially aligns the optical fiber 26 with an optical fiber 23 of a corresponding fiber optic connector mated with the fiber optic adapter. In this way, an optical connection can be made between the two fiber optic connectors mated with the fiber optic adapter.

The fiber positioning piece 34 of the fiber optic connector 22 is adapted to position (e.g., center) the free end portion 55 of the optical fiber 26 at a pre-set location relative to a form-factor defined by the front end 50 of the fiber optic connector 22. In certain examples, the fiber positioning piece 34 defines a fiber positioning passage 60 through which the optical fiber 26 extends.

It will be appreciated that the optical fiber 26 is free to slide axially relative to the fiber positioning piece 34 while the fiber positioning piece 34 generally maintains the radial positon of the free end portion 55 of the optical fiber 26 relative to the main connector body 32. When the fiber optic connector 22 is mated with a corresponding fiber optic adapter, the free end portion 55 of the optical fiber 26 slides into the fiber alignment device 25 and the end face of the free end portion 55 abuts against the end face of the optical fiber 23 of the fiber optic connector with which an optical coupling is being made. As the end faces of the optical fibers 23, 26 engage one another, the optical fiber 26 is pushed rearwardly relative to the main connector body 32 causing the optical fiber 26 to slide rearwardly relative to the fiber positioning piece 34. This causes excess optical fiber to be present in the main connector body 32. The excess fiber is taken up through the buckling of the buckling portion 61 of the optical fiber 26 within the fiber buckling region 39 defined within the fiber optic connector 22. As indicated above, the optical fiber 26 is anchored by the fiber fixation component 36 near the rear end of the fiber optic connector 22. Thus, at the fiber fixation component 36, the optical fiber 26 is prevented from moving axially relative to the main connector body 32 and is prevented from sliding back into the cable jacket 30. Thus, the excess fiber is taken up within the main connector body 32 in front of the fiber fixation component 36. As the buckling portion 61 of the optical fiber 26 buckles within the fiber buckling region 39, the elastic nature of the optical fiber 26 causes the end face of the optical fiber 26 to be biased into contact with the end face of the optical fiber 23 corresponding to the fiber optic connector to which an optical connection is being made. Normally, when a connection is not being made, the optical fiber 26 is generally straight within the main connector body 32 (see FIG. 1). When an optical connection is being made, the optical fiber 26 buckles as shown in FIG. 2.

In certain examples, the fiber optic connector 22 can be assembled by initially stripping the primary coating 73 and the buffer layer 75 from the optical fiber 26 to expose a length of bare optical fiber at the end of the optical fiber 26. The length of bare optical fiber is then inserted through the fiber fixation component 36 and a portion of the bare optic fiber (i.e., the anchored portion 57 of the optical fiber 26) is secured within the fiber fixation component 36 via the anchoring adhesive 59.

The anchoring adhesive 59 can be injected into the interior of the fiber fixation component 36 through a side port. In one example, the anchoring adhesive 59 can include an ultraviolet light curable adhesive, a heat curable adhesive, or other type of adhesive. The anchoring adhesive 59 can include an epoxy.

Preferably, the optical fiber 26 is secured to the fiber fixation component 36 with a bare fiber length of the optical fiber 26 extending forwardly beyond the front end of the fiber fixation component 36. The bare fiber portion of the optical fiber 26 extending forwardly beyond the fiber fixation component 36 is then cleaved to a desired length, and the cleaved end of the forwardly extending fiber portion can be treated to remove imperfections. For example, the forward end of the optical fiber can be polished or treated with an energy source suitable for removing imperfections at the end face of the optical fiber. In certain examples, treatment can include a plasma treatment in which an arc between two electrodes is applied to the cleaved fiber end face to shape the end face and remove imperfections through a glass re-flow process. In other examples, an energy source such as a laser may be used to shape the end face of the optical fiber. Example arc treatment operations are disclosed by PCT Publication No. WO2012/112344, which is herein incorporated by reference in its entirety.

After the end face of the stripped end of the optical fiber 26 has been treated, the re-coat layer 63 is applied to a portion of the stripped section of the optical fiber 26 corresponding to the buckling portion 61. It is advantageous for the re-coat layer 63 to not be applied to the free end portion 55 of the optical fiber 26 and particularly not be applied to the treated end face of the free end portion 55 of the optical fiber 26. In this regard, a precise application process is used to precisely apply the re-coat layer 63 to the buckling portion 61 of the optical fiber 26 without applying the re-coat layer 63 to the free end portion 55. In one example, a printing process such as a jet printing process is used to apply the re-coat layer 63 on the buckling portion 61. Alternatively, a masking material can be used to prevent the re-coat layer 63 from being applied to the free end portion 55. In one example, an index matching gel is applied to the free end portion 55 and used as a masking material for preventing the free end portion 55 from being coated with the re-coat layer 63 while the buckling portion 61 is being coated by the re-coat layer 63.

Once the re-coat layer 63 has been applied to the buckling portion 61 of the optical fiber 26, the optical fiber 26 with the fiber fixation component 36 connected thereto can be installed within the fiber optic connector 22 such that the free end portion 55 is accessible from the front of the fiber optic connector 22 and the fiber fixation component 36 is anchored at the fiber anchoring location 37 within the fiber optic connector 22. As so installed, the buckling portion 61, which is protected by the re-coat layer 63, extends through the fiber buckling region 39 of the fiber optic connector 22.

In an alternative example, the front portion of the optical fiber 26 is initially stripped to provide access to the cladding layer 53 of the optical fiber 26 for adhesive bonding within the fiber optic connector 22 for anchoring purposes. Specifically, the cladding layer 53 is initially bonded within the fiber fixation component 36 at the anchored portion 57. After the anchored portion 57 of the optical fiber 26 has been adhesively affixed to the fiber fixation component 36 and prior to securing the fiber fixation component 36 within the main connector body 32, the entire forward portion of the optical fiber 26 that extends forwardly beyond the anchored portion 57 is coated with the re-coat layer 63. After the re-coat layer 63 has been applied, the portion of the re-coat layer 63 corresponding generally to the free end portion 55 of the optical fiber 26 is stripped from the optical fiber 26 to expose the cladding layer 53 at the free end portion 55. Thereafter, the free end portion 55 of the optical fiber 26 is cleaved and processed. After the optical fiber 26 has been cleaved and processed, the optical fiber 26 is installed in the fiber optic connector 22 with the free end portion 55 located at the front of the fiber optic connector 22 and with the fiber fixation component 36 secured at the fiber anchoring location 37 within the fiber optic connector 22. As so installed, the buckling portion 61 of the optical fiber 26, a portion of which has been covered with the re-coat layer 63, extends between the fiber anchoring location 37 and the free end portion 55 of the optical fiber 26.

Figure 6:
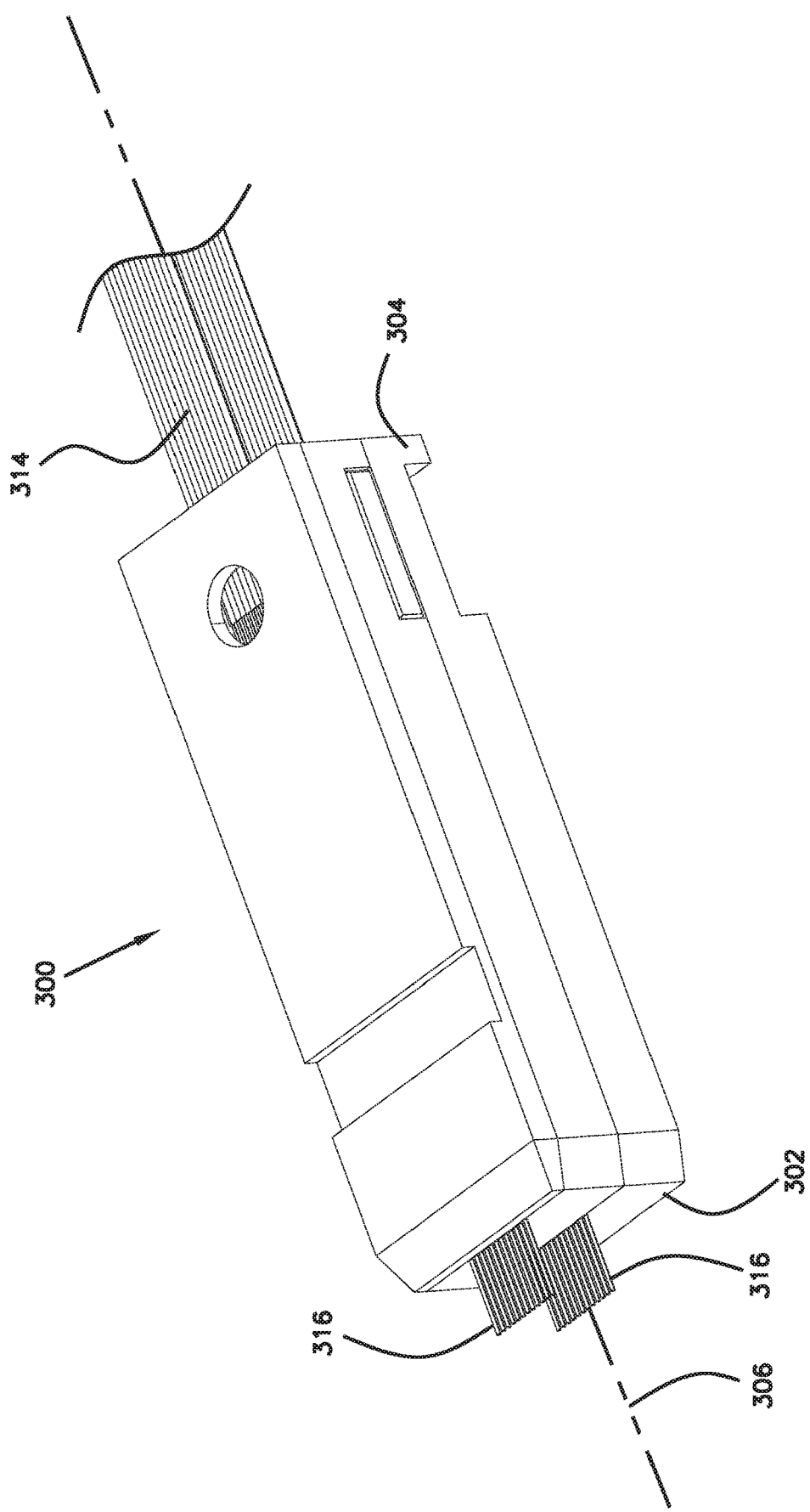
FIG. 6 illustrates a component of an example multi-fiber optical connector.
Figure 7:
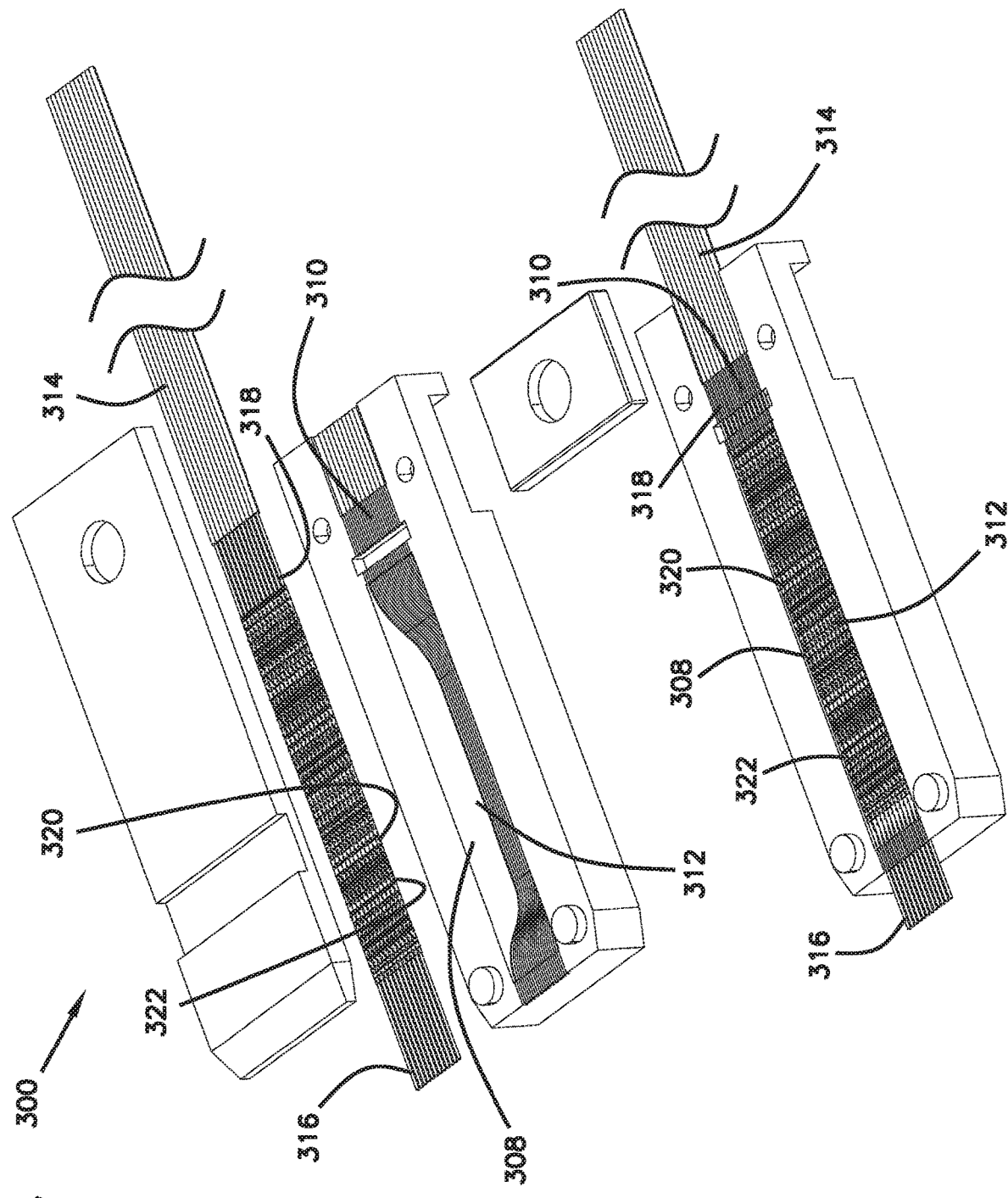
FIG. 7 is an exploded view of the component of the example multi-fiber optical connector of FIG. 6.

FIGS. 6 and 7 show a component of a multi-fiber optical connector 300 in accordance with the principles of the present disclosure. The multi-fiber optical connector 300 includes a front end 302, a rear end 304 and a longitudinal axis 306 that extends between the front end 302 and the rear end 304. The multi-fiber optical connector 300 includes an interior region 308 in which fiber anchoring locations 310 and fiber buckling regions 312 are defined. The fiber buckling regions 312 are positioned between the front end 302 and the fiber anchoring locations 310.

The multi-fiber optical connector 300 is shown also including a plurality of optical fibers 314 arranged in sets of optical fibers (e.g., rows of optical fibers such as rows of 12 optical fibers). Each of the optical fibers 314 includes a core and a cladding layer surrounding the core.

The optical fibers 314 include free end portions 316 at the front end 302 of the multi-fiber optical connector 300. The free end portions 316 are non-ferrulized. The cladding layers of the optical fibers 314 are uncoated at the free end portions 316.

The optical fibers 314 also include anchored portions 318 that are axially anchored within the multi-fiber optical connector 300 via adhesive or other means at the fiber anchoring locations 310. In certain examples, the fiber anchoring locations 310 can include an anchoring adhesive that directly contacts the cladding layers of the optical fibers 314 at the anchored portions 318.

The optical fibers 314 also include buckling portions 320 that extend between the anchored portions 318 and the free end portions 316. The buckling portions 320 are configured to buckle when the multi-fiber optical connector 300 is optically connected to another multi-fiber optical connector. At least a portion of each of the buckling portions 320 includes a re-coat layer 322 coated over the cladding layer of each optical fiber. The re-coat layer 322 can be of the type previously described and can be applied in the same manner as described with respect to the previous examples disclosed herein.

What is claimed is:

1. A fiber optic cable assembly comprising:
    a fiber optic connector having a front end, a rear end, and a longitudinal axis extending between the front end and the rear end, the fiber optic connector including an interior region in which a fiber anchoring location and a fiber buckling region are defined, the fiber buckling region being positioned between the front end of the fiber optic connector and the fiber anchoring location; and
    at least one optical fiber, the at least one optical fiber including a core and a cladding layer surrounding the core, the at least one optical fiber including a free end portion at the front end of the fiber optic connector, the free end portion being non-ferrulized, the cladding layer of the at least one optical fiber being uncoated at the free end portion, the at least one optical fiber also including an anchored portion axially anchored within the fiber optic connector at the fiber anchoring location, the fiber anchoring location including anchoring adhesive that directly contacts the cladding layer of the at least one optical fiber at the anchored portion of the at least one optical fiber, the at least one optical fiber also including a buckling portion that extends between the anchored portion and the free end portion which is configured to buckle when the fiber optic connector is optically connected to another fiber optic connector, at least a portion of the buckling portion of the at least one optical fiber including a re-coat layer coated over the cladding layer, wherein the re-coat layer has a composition that does not include acrylate.

2. The fiber optic cable assembly of claim 1, wherein a main length of the at least one optical fiber extends rearwardly from the fiber optic connector, and the main length of the at least one optical fiber includes a primary coating directly over the cladding layer.

3. The fiber optic cable assembly of claim 2, wherein the primary coating has a composition that includes acrylate.

4. The fiber optic cable assembly of claim 2, wherein the primary coating has a thickness that is greater than a thickness of the re-coat layer.

5. The fiber optic cable assembly of claim 2, wherein the primary coating has a thickness greater than 30 microns.

6. The fiber optic cable assembly of claim 2, wherein the primary coating has a thickness in the range of 55-65 microns.

7. The fiber optic cable assembly of claim 1, wherein the re-coat layer has a thickness less than or equal to 80 microns.

8. The fiber optic cable assembly of claim 1, wherein the re-coat layer has a thickness less than or equal to 70 microns.

9. The fiber optic cable assembly of claim 1, wherein the re-coat layer has a thickness less than or equal to 60 microns.

10. The fiber optic cable assembly of claim 1, wherein the re-coat layer has a thickness less than or equal to 50 microns.

11. The fiber optic cable assembly of claim 1, wherein the re-coat layer has a thickness less than or equal to 40 microns.

12. The fiber optic cable assembly of claim 1, wherein the re-coat layer has a thickness less than or equal to 30 microns.

13. The fiber optic cable assembly of claim 1, wherein the re-coat layer has a thickness less than or equal to 20 microns.

14. The fiber optic cable assembly of claim 1, wherein the re-coat layer has a thickness less than or equal to 10 microns.

15. The fiber optic cable assembly of claim 1, wherein the re-coat layer has a thickness less than or equal to 5 microns.

16. The fiber optic cable assembly of claim 2, wherein the at least one optical fiber is part of a fiber optic cable including a cable jacket that surrounds the main length of the at least one optical fiber, the fiber optic cable also including a reinforcing component anchored to the fiber optic connector.

17. A fiber optic cable assembly comprising:
a fiber optic connector having a front end, a rear end, and a longitudinal axis extending between the front end and the rear end, the fiber optic connector including an interior region in which a fiber anchoring location and a fiber buckling region are defined, the fiber buckling region being positioned between the front end of the fiber optic connector and the fiber anchoring location; and
at least one optical fiber, the at least one optical fiber including a core and a cladding layer surrounding the core, the at least one optical fiber including a free end portion at the front end of the fiber optic connector, the free end portion being non-ferrulized, the cladding layer of the at least one optical fiber being uncoated at the free end portion, the at least one optical fiber also including an anchored portion axially anchored within the fiber optic connector at the fiber anchoring location, the fiber anchoring location including anchoring adhesive that directly contacts the cladding layer of the at least one optical fiber at the anchored portion of the at least one optical fiber, the at least one optical fiber also including a buckling portion that extends between the anchored portion and the free end portion which is configured to buckle when the fiber optic connector is optically connected to another fiber optic connector, at least a portion of the buckling portion of the at least one optical fiber including a re-coat layer coated over the cladding layer, wherein a main length of the at least one optical fiber extends rearwardly from the fiber optic connector, and the main length of the at least one optical fiber includes a primary coating directly over the cladding layer, and wherein the primary coating has a composition that includes acrylate.

18. A fiber optic cable assembly comprising:
a fiber optic connector having a front end, a rear end, and a longitudinal axis extending between the front end and the rear end, the fiber optic connector including an interior region in which a fiber anchoring location and a fiber buckling region are defined, the fiber buckling region being positioned between the front end of the fiber optic connector and the fiber anchoring location; and
at least one optical fiber, the at least one optical fiber including a core and a cladding layer surrounding the core, the at least one optical fiber including a free end portion at the front end of the fiber optic connector, the free end portion being non-ferrulized, the cladding layer of the at least one optical fiber being uncoated at the free end portion, the at least one optical fiber also including an anchored portion axially anchored within the fiber optic connector at the fiber anchoring location, the fiber anchoring location including anchoring adhesive that directly contacts the cladding layer of the at least one optical fiber at the anchored portion of the at least one optical fiber, the at least one optical fiber also including a buckling portion that extends between the anchored portion and the free end portion which is configured to buckle when the fiber optic connector is optically connected to another fiber optic connector, at least a portion of the buckling portion of the at least one optical fiber including a re-coat layer coated over the cladding layer, wherein a main length of the at least one optical fiber extends rearwardly from the fiber optic connector, and the main length of the at least one optical fiber includes a primary coating directly over the cladding layer, and wherein the primary coating has a thickness that is greater than a thickness of the re-coat layer.

19. A fiber optic cable assembly comprising:
a fiber optic connector having a front end, a rear end, and a longitudinal axis extending between the front end and the rear end, the fiber optic connector including an interior region in which a fiber anchoring location and a fiber buckling region are defined, the fiber buckling region being positioned between the front end of the fiber optic connector and the fiber anchoring location; and
at least one optical fiber, the at least one optical fiber including a core and a cladding layer surrounding the core, the at least one optical fiber including a free end portion at the front end of the fiber optic connector, the free end portion being non-ferrulized, the cladding layer of the at least one optical fiber being uncoated at the free end portion, the at least one optical fiber also including an anchored portion axially anchored within the fiber optic connector at the fiber anchoring location, the fiber anchoring location including anchoring adhesive that directly contacts the cladding layer of the at least one optical fiber at the anchored portion of the at least one optical fiber, the at least one optical fiber also including a buckling portion that extends between the anchored portion and the free end portion which is configured to buckle when the fiber optic connector is optically connected to another fiber optic connector, at least a portion of the buckling portion of the at least one optical fiber including a re-coat layer coated over the cladding layer, wherein the re-coat layer has a thickness less than or equal to 60 microns.

20. A fiber optic cable assembly comprising:

a fiber optic connector having a front end, a rear end, and a longitudinal axis extending between the front end and the rear end, the fiber optic connector including an interior region in which a fiber anchoring location and a fiber buckling region are defined, the fiber buckling region being positioned between the front end of the fiber optic connector and the fiber anchoring location; and at least one optical fiber, the at least one optical fiber including a core and a cladding layer surrounding the core, the at least one optical fiber including a free end portion at the front end of the fiber optic connector, the free end portion being non-ferrulized, the cladding layer of the at least one optical fiber being uncoated at the free end portion, the at least one optical fiber also including an anchored portion axially anchored within the fiber optic connector at the fiber anchoring location, the fiber anchoring location including anchoring adhesive that directly contacts the cladding layer of the at least one optical fiber at the anchored portion of the at least one optical fiber, the at least one optical fiber also including a buckling portion that extends between the anchored portion and the free end portion which is configured to buckle when the fiber optic connector is optically connected to another fiber optic connector, at least a portion of the buckling portion of the at least one optical fiber including a re-coat layer coated over the cladding layer, wherein a main length of the at least one optical fiber extends rearwardly from the fiber optic connector, and the main length of the at least one optical fiber includes a primary coating directly over the cladding layer, and wherein the at least one optical fiber is part of a fiber optic cable including a cable jacket that surrounds the main length of the at least one optical fiber, the fiber optic cable also including a reinforcing component anchored to the fiber optic connector.

\* \* \* \* \*